(12) United States Patent
Gronchi et al.

(10) Patent No.: US 6,716,408 B1
(45) Date of Patent: Apr. 6, 2004

(54) PROCEDURE FOR PREPARING SILICA FROM CALCIUM SILICATE

(75) Inventors: Paolo Gronchi, Milan (IT); Tiziana De Marco, Curno-Bergamo (IT); Luigi Cassar, Milan (IT)

(73) Assignee: Italcementi S.p.A., Bergamo (IT)

( * ) Notice: Subject to any disclaimer, the term of this patent is extended or adjusted under 35 U.S.C. 154(b) by 0 days.

(21) Appl. No.: 09/890,515

(22) PCT Filed: Feb. 1, 2000

(86) PCT No.: PCT/EP00/00757

§ 371 (c)(1),
(2), (4) Date: Jul. 31, 2001

(87) PCT Pub. No.: WO00/46149

PCT Pub. Date: Aug. 10, 2000

(30) Foreign Application Priority Data

Feb. 3, 1999 (IT) .......................................... MI99A0197

(51) Int. Cl.[7] .............................................. C01B 33/12
(52) U.S. Cl. ....................................... 423/338; 423/339
(58) Field of Search ................................ 423/338, 339, 423/335, 333, 334

(56) References Cited

U.S. PATENT DOCUMENTS

| | | | | |
|---|---|---|---|---|
| 4,190,632 A | * | 2/1980 | Achenbach et al. | 423/118.1 |
| 4,330,519 A | | 5/1982 | Takahashi et al. | |
| 4,720,475 A | * | 1/1988 | Anton et al. | 502/250 |
| 5,595,717 A | * | 1/1997 | Harper et al. | 423/339 |
| 6,159,277 A | * | 12/2000 | Tanaka et al. | 106/272 |

OTHER PUBLICATIONS

Patent Abstracts of Japan vol. 016, No. 548 (c–1005), Nov. 18, 1992 & JP04 209717 A (Nihon Inshiyureeshiyon KK), Jul. 31, 1992.
Database WPI Section Ch, Week 197748 Derwent Publications Ltd., London, GB; AN 1977–85887Y, no month.
Database WPI Section Ch, Week 1976–52 Derwant Publications Ltd., London, GB; AN 1976–96970X, no month.

* cited by examiner

Primary Examiner—Stanley S. Silverman
Assistant Examiner—Edward M. Johnson
(74) Attorney, Agent, or Firm—Hedman & Costigan, P.C.

(57) ABSTRACT

This invention concerns a procedure for preparing amorphous silica from calcium silicate and $CO_2$, with formation and separation of precipitate $CaCO_3$.

18 Claims, 1 Drawing Sheet

PROCEDURE FOR PREPARING SILICA FROM CALCIUM SILICATE

Figure 1:
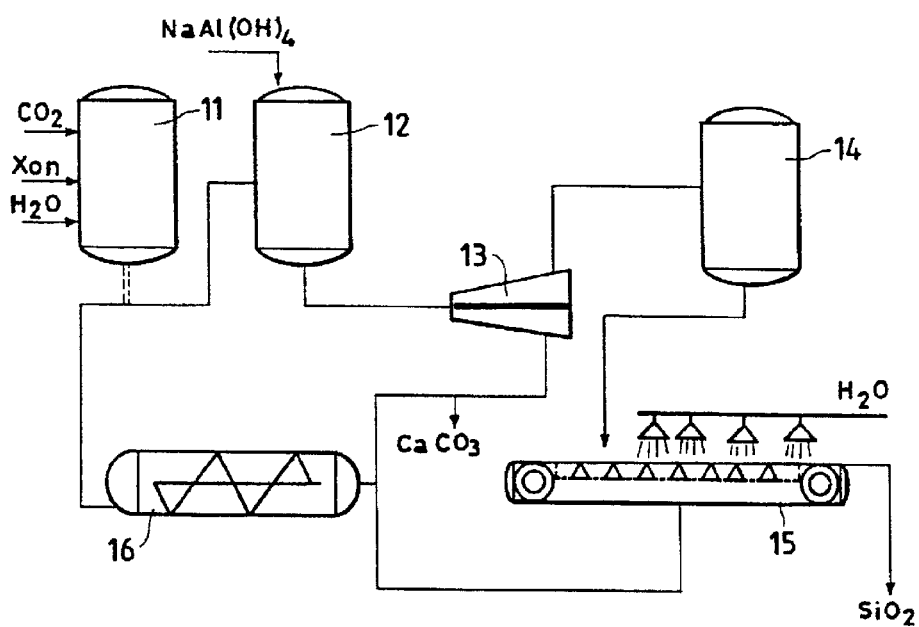

This invention concerns a procedure for preparing amorphous silica from calcium silicate.

From the literature, many methods are known for obtaining amorphous silica from various materials. The starting materials used are generally silicates of alkaline metals, preferably sodium, as described for example in W096/30301.

A particularly interesting starting material is calcium silicate.

Natural or artificial calcium silicates are low-cost materials which by means of the reaction of $CO_2$ in water, allow solid mixtures of $SiO_2$ and $CaCO_3$ to be obtained, products with a high added value.

However, the use of calcium silicates instead of silicates of alkaline metals, or particularly instead of sodium silicate, presents considerable problems due to the poor solubility of calcium silicate in water, in comparison with sodium silicate.

An example of a procedure for obtaining silica and compounds of silica and calcium carbonate from calcium silicates is described in patent CA 1,122,779. That patent describes a procedure for obtaining silica, in which the calcium silicate crystals are placed in contact with $CO_2$ in the presence of water and converted into silica, having the same configuration as crystals of silicate, and into particles of calcium carbonate attached to the particles of amorphous silica. The $SiO_2$–$CaCO_3$ mixture is not separable and so, to recover the silica, a treatment with mineral acids is carried out. The acid decomposes the calcium carbonate into $CO_2$ and calcium salts. The acid may be HCl, for example, thus obtaining $CO_2$ and calcium chloride. It is then washed with water to eliminate the calcium salt, thus obtaining an aqueous suspension containing silica. However, with a procedure of this type the quantity of silica obtained is extremely low in comparison with the volumes of liquid involved. There is therefore a low production rate per unit volume, which considerably penalises the process described even though it allows particularly pure silica to be obtained.

Moreover this procedure requires the use of an inorganic acid and it is not possible to recover the $CaCO_3$.

The aim of this invention is therefore to develop a procedure for obtaining amorphous silica from calcium silicate which presents high yield and a high production rate, along with high purity of the product.

A further aim of this invention is to obtain a process with a low degree of environmental pollution, since instead of mineral acids it uses $CO_2$ alone as the acid agent. A further aim of this invention is to recover precipitate calcium carbonate in mild temperature and pressure conditions.

The aim of this invention is therefore a procedure for preparing amorphous silica comprising the following phases:

a) reaction of a calcium silicate with $CO_2$ in an aqueous environment with the formation of a suspension 1 of agglomerated particles of $SiO_2$ and $CaCO_3$;

b) treatment of the suspension 1 with a compound of aluminium, boron or zinc or mixtures of the same in a neutral or basic environment, and formation of a solid phase 2 in a solution 3 containing particles of $SiO_2$ with nanometric dimensions;

c) separation of the solid phase 2 from the solution 3; and d) treatment of the solution 3 according to one of the following methods;

e) precipitation or drying;

f) gelation.

In the description and the claims of this invention the expression "amorphous silica" means non crystalline silica which may be obtained in the form of a gel or in the form of a precipitate.

The reaction of phase a) of the process is carried out in an autoclave at a pressure between 0.3 MPa and 3 MPa and at a temperature between 10° C. and 100° C. More particularly the phase a) is carried out at a pressure between 1.0 and 2.5 MPa and at a temperature between 15 and 40° C. Preferably the pressure is equal to 2 MPa and the temperature is equal to 20° C. or 30° C.

The pH is a function of the $CO_2$ pressure and, around a pressure of 2 MPa, it stabilises around the value 5.2. The water/calcium silicate weight ratio may have any value, preferably between 16 and 6.4.

In these conditions of temperature, reagent concentration, pressure and pH, the reaction proceeds with the dissolution of the calcium silicate and concludes with the formation of an aqueous suspension 1 of agglomerated particles of $SiO_2$ and $CaCO_3$.

The simultaneous precipitation of $SiO_2$ and $CaCO_3$ could be avoided by carrying out the reaction with low loads of calcium silicate (water/calcium silicate weight ratio greater than 16), obtaining a precipitate composed prevalently of $CaCO_3$ in the presence of a solution containing nanometric particles of silica. In this system, however, the quantity of silica in the solution would be too low and therefore not sufficient for an industrial realisation of the process.

Even if the load of silica were increased, the concentration of silica in the solution would not exceed 10 $kg/m^3$ (±4); moreover in these experimental conditions this solution is a metastable phase which tends to gel quickly, preventing the separation of the silica from the precipitated solid composed of $CaCO_3$.

It is known from the literature that the stabilising of a solution containing amorphous silica in particles is a function of the increase of thee pH up to alkaline values ≧9.5 or of the reduction of the concentrations of alkaline ions (R. K. Iler, The Chemistry of Silica, 1979). Alkaline pH values may be easily obtained by adding, for example, NaOH, while the problem of reaching higher concentrations of silica in the aqueous phase is more difficult to solve.

In order to solve this problem, the procedure according to this invention is characterised by the phase b), that is the reaction of the aqueous suspension 1, coming from the acid dissolution, with a compound of aluminium, boron or zinc or mixtures of the same in a neutral or basic environment.

The neutral or basic environment (pH≧7) is preferably realised using a solution of hydroxides or salts of alkaline metals or alkaline earth metals. In particular, the solution is an aqueous solution of hydroxides of alkaline metals or alkaline earth metals and, even more particularly, the solution is an aqueous solution of sodium hydroxide.

The compound of aluminium, boron or zinc is preferably a salt chosen among aluminates, borates or zincates. In particular, the salt is an alkaline aluminate or an alkaline earth aluminate and, even more preferably, the salt is a sodium aluminate.

The treatment in phase b) is decisive for the development of the entire process, being essential for the separation, of silica from carbonate.

This reaction allows the modification of the silica surface and the increase of its concentration in the solution 3 at least up to 50–60 $kg/m^3$.

The solution 3 which forms in phase b) contains particles of silica of with nanometric dimensions defined as "primary particles". In particular the dimensions of the primary particles are between 1 and 100 nanometers.

The third phase c) of the process includes the separation of the solid phase 2 rich in calcium carbonate from the solution 3 containing silica.

The separation phase c) is carried out by means of any of the known methods for phase separations, preferably it is done by centrifugation; if the separated solid mixture still contains silica aggregated with carbonate, it may be recycled and again subjected to the treatment with aluminate.

The fourth phase d) of the process contemplates treatment of the solution 3 containing silica, according to one of the following methods:

according to the first method, indicated as e), the treatment may be carried out preferably by drying or precipitation, obtaining precipitated silica.

Precipitation may come about by means of variation of the chemical-physical parameters, with or without the addition of precipitating agents.

In particular, precipitation may come about with the addition of $CO_2$, at environment pressure and temperature. Afterwards there is the separation of the phases that formed during the precipitation phase. In particular, this separation may be achieved by means of filtration. The solid kept back by the filter is washed until a neutral pH (about 7) is reached in the washing waters. According to the method f), the treatment leads to gelation, followed by evaporation of the liquid phase. The gelation treatment, as known in the art, is achieved by acidification, for example by adding $CO_2$, at environment temperature, to a pH lower than 7. Depending on the temperature at which evaporation takes place, cryogel, aerogel or xerogel may be obtained.

It is to be noted that the first phase of the process (reaction of calcium silicate with $CO_2$) and the second phase of the process (treatment with salts containing aluminium, boron or zinc) may also be simultaneous and carried out in the same reactor, adequately checking the pH with suitable buffers.

A further aim of this invention is the use of the amorphous silica obtained with the procedure according to this invention as an additive in mixtures for tyres with low rolling resistance force or as a mineral addition in High Performance Concretes (HPC), such as high or very high strength concrete (preferably more than 100 MPa).

The term High Performance Concretes (HPC) identifies a class of cement mixes with characteristics of high mechanical strength (compression strength Rc at 28 days greater than 60 MPa).

An example of HPC is a high-strength concrete known as DSP (densified with, small particles). In this material the microstructure of the cement matrix is densified by adding silica fume. In DSP it is possible to reach Rc at 28 days greater than 100 MPa.

In particular, also the compound material composed of the mixture of silica and calcium carbonates, obtained according to the procedure of this invention, may be used directly as an additive in mixtures for tyres or in high-performance concretes, for example in a high-strength concrete (DSP).

Moreover the amorphous silica obtained with the procedure according to this invention may be used in many other sectors; it may be used as a reinforcing load in rubber and other organic polymers, as a pigment partially substituting $TiO_2$ in the production of paper and coating, as a dimmer in the water paint and varnishes industry, as a thinner in solid formulations, as an anti-blocking agent to prevent adhesion between smooth surfaces, as an anti-binding agent or a catalytic support.

The principal advantage of the procedure according to this invention is that of obtaining high-purity amorphous silica by means of a process with a low environmental impact, presenting high production rate and high yield at the same time.

A further advantage of this invention is that of obtaining precipitated calcium carbonate in the form of fine particles.

The starting material may be natural, synthetic, crystalline and amorphous calcium silicates.

The starting material may also be clinker of Portland cement. By clinker of Portland cement is meant a hydraulic material which must be composed of at least two thirds in mass of calcium silicates ($3CaO.SiO_2$) and ($2CaO/SiO_2$). The remaining part contains aluminium oxide ($Al_2O_3$), ferric oxide ($Fe_2O_3$) and other oxides. The $CaO/SiO_2$ mass ratio must not be less than 2.0. The magnesium oxide (MgO) content must not exceed 5.0% of the mass.

Clinker of Portland cement is obtained by the baking, at least as far as sintering, of a precisely established mixture of raw materials (raw meal, paste or suspension) containing CaO, $SiO_2$, $Al_2O_3$ and small quantities of other materials. The raw meal, paste or suspension must be finely ground, closely mixed and therefore be homogeneous. The clinker of Portland cement used as the starting material for the process of this invention is preferably rich in silicates and contains low percentages of the other oxides.

A calcium silicates which can be used as the starting material in the process according to this invention is xonotlite ($Ca_6Si_6O_{17}(OH)_2$) which may be synthesised in hydrothermal conditions according to the following reaction: $CaO/Ca(OH)_2$+silica (or sand or quartz)+$H_2O$+minor components (silica fume, bentonite) are made to react in the presence of water vapour at a temperature between 176 and 240° C., at a pressure of 1.4–1.5 MPa, for a time of 1 to 24 hours, preferably from 1 to 7 hours, with a molar ratio CaO/$SiO_2$ between 0.65 and 1 and with a specific surface of the reagents from 18 to 22 $m^2$. After cooling, filtration and washing, crystals of xonotlite are obtained.

It is also possible to use as starting material a calcium silicate which may be crystalline or prevalently amorphous. In particular, feeding pure quartz with a diameter<40 $\mu$m, CaO (containing about 7% $CaCO_3$, with diameter <25 $\mu$m), silica fume and bentonite in a one-litre stainless steel autoclave, lined, with agitator, and letting it react at a temperature between 195 and 200° C. for 24 hours at a pressure of 1.53 MPa, prevalently crystalline calcium silicate is obtained. Instead, using reaction times of 4–7 hours, prevalently amorphous silicates are obtained with a surface area equal to approximately 100 $m^2$/g.

Another calcium silicate that may be used as a starting material is tobermorite.

The following tables 1 and 2 list some conditions of synthesis of xonotlite (xon-1, xon-2, xon-3) and of amorphous hydrate calcium silicates (CSH-1, CSH-2, CSH-3, CSH-4 and CSH-5) which may be used as starting materials for the procedure according to this invention.

TABLE 1

| Feed | XON-1 | XON-2 | XON-3 |
|---|---|---|---|
| CaO | 55.9% | 51.35% | 51.3% |
| $SiO_2$ | 43.9% | 48.5% | 48.5% |
| Silica fume | 0.2% | 0.1% | 0.2% |
| Bentonite | 0.05% | 0.05% | 0.05% |
| $H_2O$ | 480% | 1200% | 1200% |
| Ca/Si | 1.12 | 0.98 | 1.00 |
| $H_2O$/dry | 4.8 | 12.00 | 12.00 |

TABLE 1-continued

| Feed | XON-1 | XON-2 | XON-3 |
|---|---|---|---|
| Temperature | 185° C. | 195° C. | 200° C. |
| Pressure | 1.1 MPa | 1.4 MPa | 1.5 MPa |
| Reaction time | 24 h | 7 h | 4 h |
| Pressurisation | 2.5 h | 2.5 h | 2.5 h |
| Depressurisation | 6 h | 6 h | 6 h |

TABLE 2

| Feed | CSH-1 | CSH-2 | CSH-3 | CSH-4 | CSH-5 |
|---|---|---|---|---|---|
| CaO | 52.9% | 52.9% | 48.9% | 51.3% | 51.3% |
| $SiO_2$ | 46.8% | 46.8% | 50.9% | 48.5% | 48.5% |
| Silica fume | 0.2% | 0.2% | 0.1% | 0.2% | 0.2% |
| Bentonite | 0.05% | 0.05% | 0.05% | 0.05% | 0.05% |
| $H_2O$ | 480% | 480% | 500% | 480% | 970% |
| Ca/Si | 1.07 | 1.07 | 0.89 | 1.00 | 1.00 |
| $H_2O$/dry | 4.8 | 4.8 | 5.0 | 4.8 | 9.7 |
| Temperature | 175° C. | 130° C. | 197° C. | 198° C. | 198° C. |
| Pressure | 0.85 MPa | 0.3 MPa | 1.4 MPa | 1.4 MPa | 1.4 MPa |
| Reaction time | 7 h | 0 h | 4 h | 2 h | 4 h |
| Pressurisation | 2.5 h | 1.5 h | 2.5 h | 2.5 h | 2.5 h |
| Depressurisation | 6 h | 6 h | 6 h | 6 h | 6 h |

FIG. 1 shows an exemplificative diagram representing a particular embodiment of a system for carrying out the procedure according to this invention.

In the diagram shown in FIG. 1, 11 indicates the dissolving reactor, 12 the alumination reactor, 13 the solid-liquid centrifuge, 14 the drier or the precipitation reactor, 15 the washing-drying unit and 16 the mixing unit.

According to this diagram, $CO_2$, xonotlite or calcium silicate and $H_2O$ are loaded at 11 and the dissolution reaction then occurs by acid: attack of the silicate; the product obtained arrives at 12 where it is treated with preconstituted solutions of sodium aluminate. At 13 there is then the separation by centrifugation of a solid phase and a liquid phase.

The solid phase, coming from 13, which by spectroscopic analysis reveals the presence of carbonates, may be sent by means of the mixer 16 to the alumination reactor 12 where it is again treated with sodium aluminate, while the liquid phase is sent to the reactor 14. The dried/precipitated product arrives at the washing-drying unit 15, from which the final product, silica, is obtained.

The solid phase, coming from 13, may also be sent back to the dissolution reactor 11.

The characteristics and the advantages of the procedure according to this invention will be better understood from the following detailed and exemplificative description.

EXAMPLE 1A 25 g of (pure) Xonotlite coming from hydrothermal synthesis and having a specific surface BET equal to 54 $m^2$/g were suspended in 400 ml of water (volume $H_2O$/g of xonotlite=16) and the suspension was kept in agitation in a one-litre stainless steel autoclave. The reactor was pressurised with $CO_2$ at 2.0 MPa and the temperature kept at 20° C. The dissolution reaction was made to proceed for 1 hour, up to a pH of about 5.2. The autoclave was then depressurised and the suspension obtained was filtered. The solid obtained from filtration was composed of the mixture of silica and precipitated calcium carbonate, with percentages (of the dry product) of respectively 51.4% and 48.6%.

This mixture was treated with an aqueous solution of sodium aluminate, prepared from NaOH in quantity 1 M and Al in quantity 0.01 M, at environment temperature, under agitation, for 2 hours.

After centrifugation and drying of the surnatant liquid (at pH=10), a dry residue was obtained (110° C., 4 hours) which on IR analysis revealed an intense and broad absorption at 1015 $cm^{-1}$, which may be attributed to silicoaluminate entities. The thermal analysis agrees with the respective spectrophotometric analysis and revealed a high weight loss (about 2.5%) which may be attributed to the loss of free and bonded water (T≦400° C.). The weight loss at T>400° C. is very low (5–10%) and indicates the presence of a low percentage of carbonate and the transformation of the hydroxides present into oxides.

The trend of the curves is very different, for example, from the one that may be obtained analysing the dry residue of the colloidal phase obtained directly after the acid dissolving attack of the phase a).

After treatment-of the $CaCO_3/SiO_2$ mixture with a solution of sodium aluminate, the solid obtained from drying of the surnatant liquid presented on spectroscopic analysis some absorption bands characteristic of carbonates.

Once washed in water, the IR analysis allowed it to be revealed that these absorption bands were found in the washing waters and no longer in the solid residue, which was therefore silica with high purity.

The precipitated silica obtained after treatment with sodium aluminate is impure with $Na_2CO_3$, which is water-soluble and can therefore be removed with washing.

The characterisation of the precipitated silica obtained is shown in the following table 3.

TABLE 3

| Characterisation of precipitated silica (Example 1A). | |
|---|---|
| Specific surface BET ($m^2$/g) | 63; |
| pH (5% aqueous solution) | 7; |
| loss at 105° C. (%) | 4.5%; |
| loss to fire — 1000° C. | 11.7%; |
| Analysis of the calcinated product at 1000° C. for 2 hours: | |
| $SiO_2$ (%) | 96.5; |
| $Al_2O_3$ (%) | 0.65; |
| $Na_2O$ (%) | 1.35; |
| CaO (%) | 1.4; |
| $Fe_2O_3$ (%) | 0.01 |

The specific surface B.E.T. is determined according to the BRUNAUER-EMMET-TELLER method described in the Journal of the American Chemical Society, vol. 60, page 309, February 1938 and according to standard ISO 9277–95.

The pH is determined according to standard ISO 787/9 (pH of a 5% suspension in $H_2O$).

EXAMPLE 1B

The solid residue coming from centrifugation in the previous example 1A was again suspended in water and treated with sodium aluminate and afterwards centrifuged and dried. This further treatment with sodium aluminate allowed a further recover of silica, allowing a possible exhaustion of the silica present in the starting mixture. The characterisation of the precipitated calcium carbonate, obtained after three treatments with sodium aluminate, is shown in the following table 4.

TABLE 4

Characterisation of precipitated CaCO₃ (Example 1B).

| | |
|---|---|
| Specific surface BET (m²/g) | 9; |
| pH (5% aqueous solution) | 10; |
| loss at 105° C. (%) | ≦2; |

EXAMPLE 2

A mixture composed of Xonotlite and Tobermorite in weight ratios 70:30 was suspended in water (70 g of mixture in 450 g of water) and the suspension kept in agitation in a one-litre stainless steel autoclave. The reactor was pressurised with $CO_2$ at 2.0 MPa and the temperature kept at 30° C. The reaction was carried out for 30 minutes, always in agitation, up to a pH of about 5.2. The autoclave was then depressurised and an aqueous solution of sodium aluminate, prepared from NaOH in quantity 3 M and Al in granules in quantity 0.03 M, was directly added in the reactor. The suspension was kept at environment pressure and temperature, under agitation, for 2 hours. After that period, the suspension in the reactor is centrifuged. Into the liquid, which has a pH value of 11, separated from the solid phase and kept under agitation, $CO_2$ is bubbled until a pH of 7.5 is reached.

The solid and liquid are then separated by filtration. The solid kept back by the filter is washed with deionised water (until a pH of 7 is obtained in the washing water). The solid obtained is composed of precipitated silica with high purity and it has the characteristics listed table 5.

EXAMPLE 3

A mixture composed of Xonotlite and Tobermorite is treated substantially following the description in example 2 up to the stage in which the suspension in the reactor is centrifuged. Into the liquid, separated from the solid phase and kept under agitation, $CO_2$ is bubbled until a pH of 6.5 is reached. The solution gels and is separated by filtration. The gel solid kept back by the filter is washed with deionised water (until a pH of 7 is obtained in the washing water), then dried and crushed.

The specific surface BET of the amorphous silica thus obtained is 90 m²/g:

TABLE 5

Characterisation of precipitated silica (Example 2).

| | |
|---|---|
| Specific surface BET (m²/g) | 160; |
| pH (5% aqueous solution) | 7; |
| loss at 105° C. (%) | 4.3; |
| loss to fire — 1000° C. (%) | 12; |
| Analysis of the calcinated product at 1000° C. for 2 hours: | |
| $SiO_2$ (%)   97; | |
| $Al_2O_3$ (%)   0.7; | |
| $Na_2O$ (%)   1.05; | |
| CaO (%)   1.24; | |
| $Fe_2O_3$ (%)   0.01 | |

The following examples refer to a number of tests of application.

EXAMPLE 4

Using the precipitated silica obtained in example 1A, DSP concrete having the following composition was prepared:

| | |
|---|---|
| Cement CEM I 52.5 (Ultracem R) | 642 g; |
| Aggregate: spherical quartz (max. diam. = 3.2 mm) | 1200 g; |
| Precipitated silica (S.S. BET = 63 m²/g) | 80 g; |
| Super-fluidifying acrylic additive (Superflux 2000 AC) | 44 g; |
| Mixing water | 149 g; |
| Water/binder* ratio | 0.25; |
| Aggregate/binder ratio | 1.66 |

*binder = cement + precipitated silica

With this mixture three test pieces with dimensions 40×40×160 mm were prepared and were subjected to accelerated curing (24 hours in water at 80° C.).

The mechanical strength values measured on the test pieces were:

Rc=119 MPa;
Rf=18.7 MPa.

EXAMPLE 5

A mixture for tyres was prepared containing precipitated silica from example 2.

The specific surface BET o the silica was 160 m²/g.

The mixture was prepared with 40 parts of silica to every 100 parts of styrene butadiene rubber (SBR) and presents the following characteristics:

| | |
|---|---|
| Ultimate elongation = | 720%; |
| Ultimate tensile tress = | 16 MPa; |
| Modulus at 500% = | 6.5 MPa. |

So, as previously indicated and shown, the precipitated silica obtained with the procedure according to this invention may be successfully used in high-performance concretes, such as high or very high strength concretes (DSP) or it may be added to mixtures for tyres with low rolling resistance force.

It was also found that both the solid phase 2 and the solution 3 obtained at the end of phase c) of the procedure according to this invention may be used with excellent results as additives in mixtures for tyres and in high performance concretes (for example high or very high strength concretes).

What is claimed is:

1. Procedure for preparing amorphous silica comprising the following phases:
    a) reaction of a calcium silicate with $CO_2$ in an aqueous environment with the formation of a suspension 1 of agglomerated particles of $SiO_2$ and $CaCO_3$;
    b) treatment of the suspension 1 with a compound of, aluminium, boron or zinc or mixtures of the same in a neutral or basic environment, and formation of a solid phase 2 in a solution 3 containing particles of $SiO_2$ with nanometric dimensions;
    c) separation of the solid phase 2 from the solution 3;
    d) treatment of solution 3 according to one of the following methods;
    e) precipitation or drying;
    f) gelation.

2. Procedure according to claim 1, wherein the reaction of phase a) is carried out in an autoclave at a pressure between 0.3 MPa and 3 MPa and at a temperature between 10° C. and 100° C.

3. Procedure according to claim 2, wherein the pressure is between 1.0 and 2.5 MPa and the temperature is between 15 and 40° C.

4. Procedure according to claim 3, wherein the pressure is equal to 2 MPa and the temperature is equal to 20° C. or 30° C.

5. Procedure according to claim 1, wherein the compound of aluminium, boron or zinc is a salt chosen among aluminates, borates or zincates.

6. Procedure according to claim 5, wherein the salt is an alkaline aluminate or an alkaline earth aluminate.

7. Procedure according to claim 5, wherein the salt is a sodium aluminates.

8. Procedure according to claim 1, wherein the neutral or basic environment is realised using a solution of hydroxides or salts of alkaline metals or alkaline earth metals.

9. Procedure according to claim 8, wherein the solution is an aqueous solution of hydroxides of alkaline metals or alkaline earth metals.

10. Procedure according to claim 8, wherein the solution is an aqueous solution of sodium hydroxide.

11. Procedure according to claim 1, wherein the particles of silica in the solution 3 have dimensions between 1 and 100 nanometers.

12. Procedure according to claim 1, wherein the separation phase c) is carried out by centrifugation.

13. Procedure according to claim 1, wherein the solid phase 2 coming from the separation phase c) is recycled so as to be again subjected to treatment with sodium aluminate as in phase b).

14. Procedure according to claim 1, wherein the precipitation treatment e) is carried out with the addition of $CO_2$, at environment pressure and temperature.

15. Procedure according to claim 14, wherein the phases that formed during the precipitation phase are separated by filtration and the solid kept back by the filter is washed until a neutral pH is reached in the washing waters.

16. Procedure according to claim 1, wherein the gelation treatment f) is achieved by acidification, for by adding $CO_2$, at environment temperature, to a pH lower than 7, and is followed by the evaporation of the liquid phase.

17. Precipitated silica that can be obtained with the procedure according to one of the claims from 1 to 16, characterised by having purity≧96%.

18. Composition of precipitated silica which may be obtained according to the procedure of claim 1.

* * * * *